(12) United States Patent
Hanes

(10) Patent No.: US 9,218,539 B2
(45) Date of Patent: Dec. 22, 2015

(54) UPLOAD AN IMAGE TO A WEBSITE SERVER USING A POINTING DEVICE

(75) Inventor: David H Hanes, Loveland, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 910 days.

(21) Appl. No.: 13/457,110

(22) Filed: Apr. 26, 2012

(65) Prior Publication Data
US 2013/0285893 A1    Oct. 31, 2013

(51) Int. Cl.
*G06F 15/16*    (2006.01)
*G06K 9/54*    (2006.01)
*G09G 5/00*    (2006.01)
*G06Q 50/00*    (2012.01)

(52) U.S. Cl.
CPC   *G06K 9/54* (2013.01); *G06Q 50/01* (2013.01); *G09G 5/00* (2013.01)

(58) Field of Classification Search
CPC ......................................................... G06K 9/54
USPC .................. 709/218, 206, 217, 231; 345/156; 382/305
See application file for complete search history.

(56) References Cited

U.S. PATENT DOCUMENTS

| 7,669,135 B2 | 2/2010 | Cunningham et al. | |
| 2003/0101237 A1* | 5/2003 | Ban et al. | 709/218 |
| 2011/0083090 A1* | 4/2011 | Gwiazda et al. | 715/769 |

FOREIGN PATENT DOCUMENTS

DE    20301727 U1    7/2003

OTHER PUBLICATIONS

"Social Network Access Keyboard—Facebook dedicated keyboard." GadgetsCrunch. Web. Downloaded Apr. 25, 2012. <http://gadgetscrunch.com/social-network-access-keyboard-facebook-dedicated-keyboard/>.
Charles West. "Motokey Social coming to TELUS, brings a dedicated Facebook button." The Trendaholic. Nov. 1, 2011. Web. Downloaded Apr. 25, 2012. <http://thetrendaholic.com/2011/11/01/motokey-social-coming-to-telus-brings-a-dedicated-facebook-button/>.
David J. Martin. "HTC Salsa—Your Gateway to Facebook." Ezine Articles. Sep. 23, 2011. <http://ezinearticles.com/? HTC-Salsa---Your-Gateway-to-Facebook&id=6581780>.
Rohan Makkar. "Keyboard Shortcuts in Facebook." The PC Wizard. Apr. 1, 2011. <http://rohanthepcwizard.blogspot.com/2011/04/keyboard-shortcuts-in-facebook.html>.

* cited by examiner

*Primary Examiner* — Frantz Jean
(74) *Attorney, Agent, or Firm* — HP Legal Department

(57) ABSTRACT

Uploading an image to a website server receives position data defining an image area on a display screen of an image to be uploaded. An image file is created of the image area and uploads the image to the website server. In some examples, the position data are provided by a pointing device with an image upload button.

16 Claims, 10 Drawing Sheets

UPLOAD AN IMAGE TO A WEBSITE SERVER USING A POINTING DEVICE

DESCRIPTION OF THE RELATED ART

Social networking and photo-sharing services, such as websites, provide a user with the ability to upload images, such as photographs, to a user account. The user may further organize the images into separate albums. Social networking or photo-sharing websites facilitate the sharing of images and photographs among users.

Currently, methods to upload images to a social networking or photo-sharing website involve invoking a function on the website. The website provides a user interface to allow the user to navigate to the image file to be uploaded. The user interface may further provide a selection to the user to upload the image to an album or to create an album to contain the uploaded image.

DETAILED DESCRIPTION OF THE PREFERRED EMBODIMENTS

In examples of the present invention, a method to upload an image to a website server receives position data defining an image area on a display screen of an image to be uploaded. The method creates an image file of the image area and uploads the image to the website server. In some examples, the position data are provided by a pointing device with an image upload button. The image upload method simplifies the image upload process for social networking and photo-sharing websites and improves user experience. In the following description, various embodiments will be described below by referring to several examples.

Figure 1:
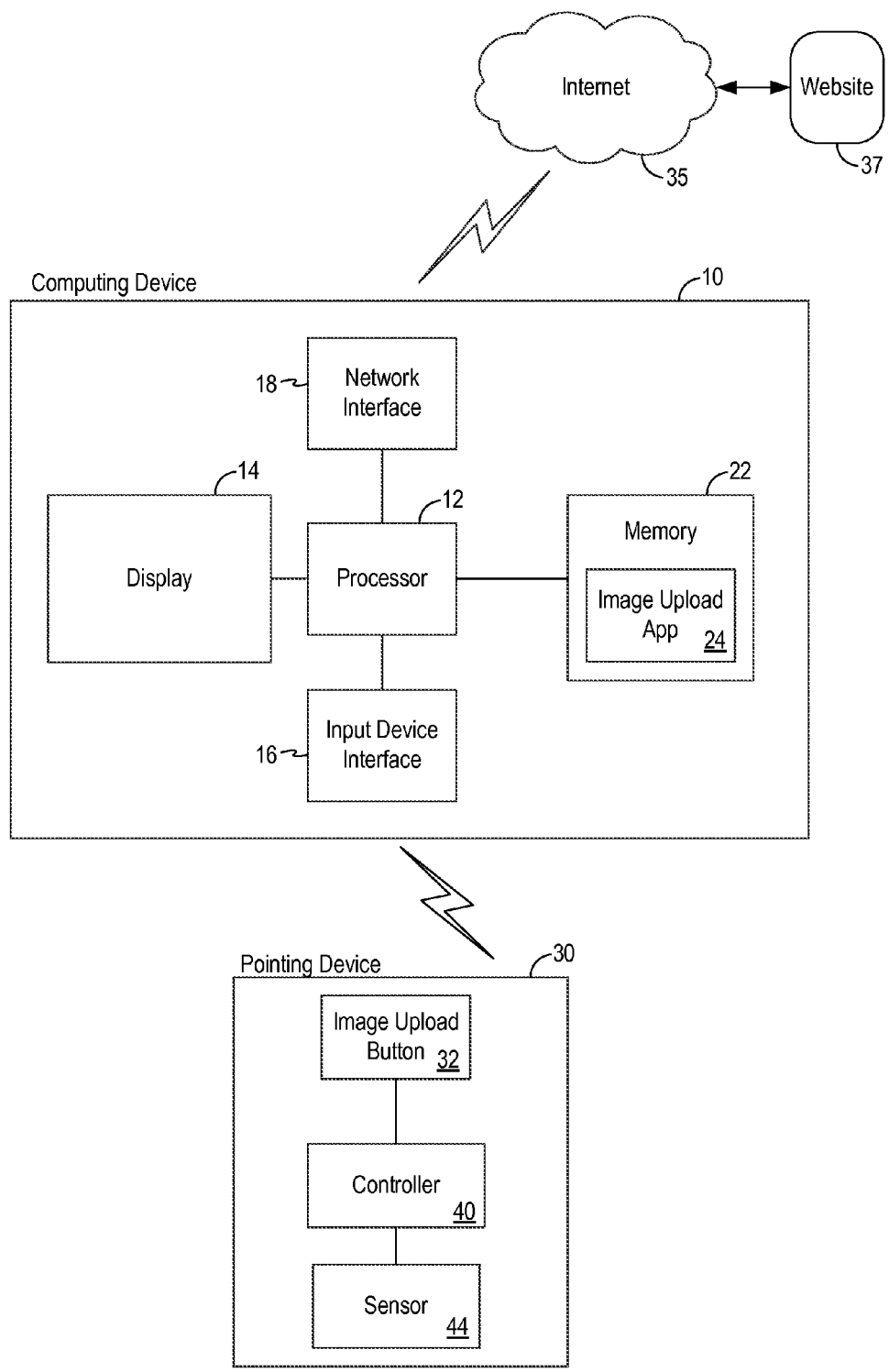
FIG. 1 is a block diagram of a computing system including a computing device and a pointing device according to examples of the present invention.

FIG. 1 is a block diagram of a computing system including a computing device and a pointing device in one example. Referring to FIG. 1, a computing system includes a computing device 10 and a pointing device 30. The computing device 10 may be a desktop computer, a laptop computer, a tablet computer, other personal computers or a smartphone. The computing device 10 includes a processor 12, a display 14, an input device interface 16, a network interface 18, and a memory 22. The processor 12 loads the code for an image upload application 24 from the memory 22, such as to a volatile memory, executes the code, and stores application data in the volatile memory during runtime. The computing device 10 displays a graphical user interface (GUI) generated by the processor 12 on the display 14. The computing device 10 receives user input on the input device interface 16. The computing device 10 further communicates with a website 37 over a data network 35 through the network interface 18. Both the input device interface 16 and the network interface 18 can be a wired or wireless interface. The input device interface 16 may be implemented using wireless communication, such as through radio frequency. In some examples, the input device interface may be implemented as a Bluetooth wireless interface or as a universal serial bus (USB) wireless interface. Alternately, the computing device 10 may communicate with the pointing device 30 through wired communication, such as through USB connectors.

In the example shown in FIG. 1, a pointing device 30 communicates with the computing device 10 through wireless communication. The pointing device 30 may be implemented as any computer pointing devices currently available or to be developed, including a mouse, a joystick, a touch pad, track ball, or other human interface device (HID) input device. In some examples, the pointing device may be a touchscreen input system. Pointing device 30 functions in conjunction with a graphical user interface (GUI) provided by the computing device 10 and is often associated with a graphic cursor. In the present example, pointing device 30 is a computer mouse and may include a left mouse button, a right mouse button and a middle button which can be a scroll wheel. The mouse buttons and scroll wheel allow the user to operate the mouse in a conventional manner, such as for cursor pointing functions. That is, pointing device 30 is conventionally used to generate pointing data suitable for controlling a position of a cursor which may be present on the display associated with the computing device. The pointing device 30 includes a sensor 44 to detect movements of the pointing device. In one example, the sensor 44 may be an optical displacement detection system or other position determination system. The pointing device 30 further includes a controller 40 to control operations of the mouse. The pointing device 30 may further include a transmitter for communicating with the computing device and a power supply supplying power to the pointing device, such as when the pointing device is a wireless mouse.

Furthermore, the pointing device 30 is provided with an image upload button 32 in some examples. In physical implementation, the image upload button 32 may be positioned on the top surface of the mouse housing. In other examples, the image upload button may be positioned adjacent to a mouse button, such as adjacent the left mouse button. The exact positioning of the image upload button on the pointing device is not critical to the practice of the present invention. In the case the pointing device is a touchscreen input system, the image upload button may be a soft button. The image upload button 32 is operative to enable fast and simple uploading of images from the computing device to the website 37, as will be described in more detail below. For example, the website 37 can be a social networking website or a photo-sharing website.

Figure 2:
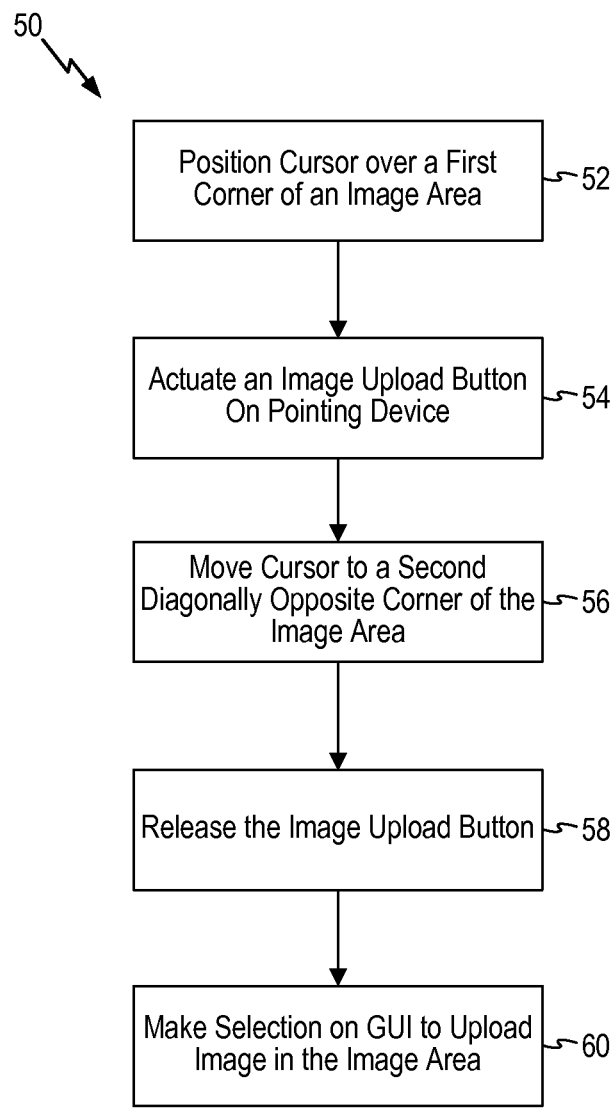
FIG. 2 is a flow chart of a method for image uploading using a pointing device according to examples of the present invention.

FIG. 2 is a flow chart of a method for image uploading using a pointing device in one example. Referring to FIG. 2, the method 50 for image uploading is executed by the processor 12 of the computing device 10 in FIG. 1, in conjunction with the pointing device 30. At block 52, the pointing device 30 is used to position the cursor over a first corner of an image area containing an image to be uploaded. The image can be any part of the computer display currently presented on the display 14 of the computing device 10. Then, at block 54, the image upload button 32 of the pointing device 30 is actuated. With the image upload button 32 actuated, at block 56, the pointing device 30 is moved to position the cursor over a second corner of the image area where the second corner is opposite and diagonal to the first corner. At block 58, the image upload button on the pointing device is released. The actuation and release of the image upload button generate position data describing the image area to be uploaded. The image upload application 24 executed by the processor 12 of the computing device 10 receives the position data describing the image area and may provide a GUI on the display 14. At block 60, a selection is made through the GUI to upload the image contained in the image area to a website server. Accordingly, method 50 provides a simple and easy-to-use way to upload an image to a website server by using a pointing device to draw an image area of an image to be uploaded.

In the following description, examples of the image upload method are described and the examples described herein may include one or more operations, functions, or actions illustrated as one or more blocks in the following figures. Although the blocks are illustrated in sequential orders, these blocks may also be performed in parallel, and/or in a different order than those described herein. Also, the various blocks may be combined into fewer blocks, divided into additional blocks, and/or eliminated based upon the desired implementation.

Figure 3:
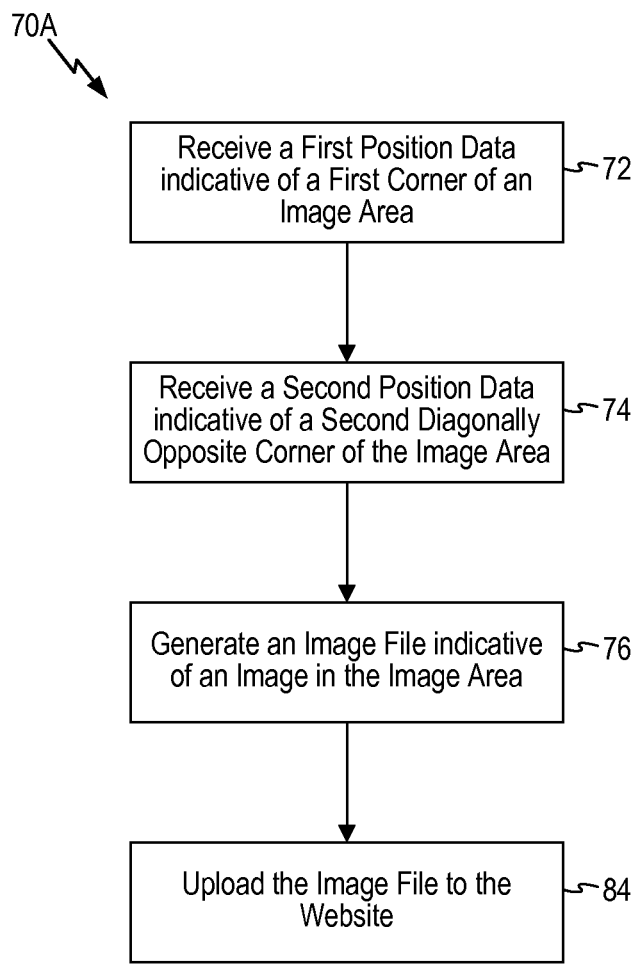
FIG. 3 is a flow chart of an image upload method according to examples of the present invention.

FIG. 3 is a flow chart of an image upload method in one example. Referring to FIG. 3, the image upload method 70A is executed by the processor 12 of the computing device 10 to implement uploading of an image to a website server. Executing the code for image upload application 24, the processor 12 receives input data from the pointing device 30 and may provide a graphical user interface (GUI) on the display 14.

In some examples, the image upload application 24 may be preconfigured by requesting and storing login information associated with a website server, such as user name and password, for a user account. In this manner, image upload method 70A realizes seamless uploading of images to the website server. In the event that user login information is not preconfigured, the image upload method 70A will request for the user login information for the user account when image upload is to be carried out, as will be explained in more detail below.

Image upload method 70A starts at block 72 where a first position data indicative of a first corner of an image area is received. Then, at block 74, the image upload method 70A receives a second position data indicative of a second corner of the image area where the second corner is opposite and diagonal to the first corner. At block 76, image upload method 70A generates an image file indicative of the image content in the image area. The image upload method 70A then uploads the image file to the website server (block 84).

Figure 4:
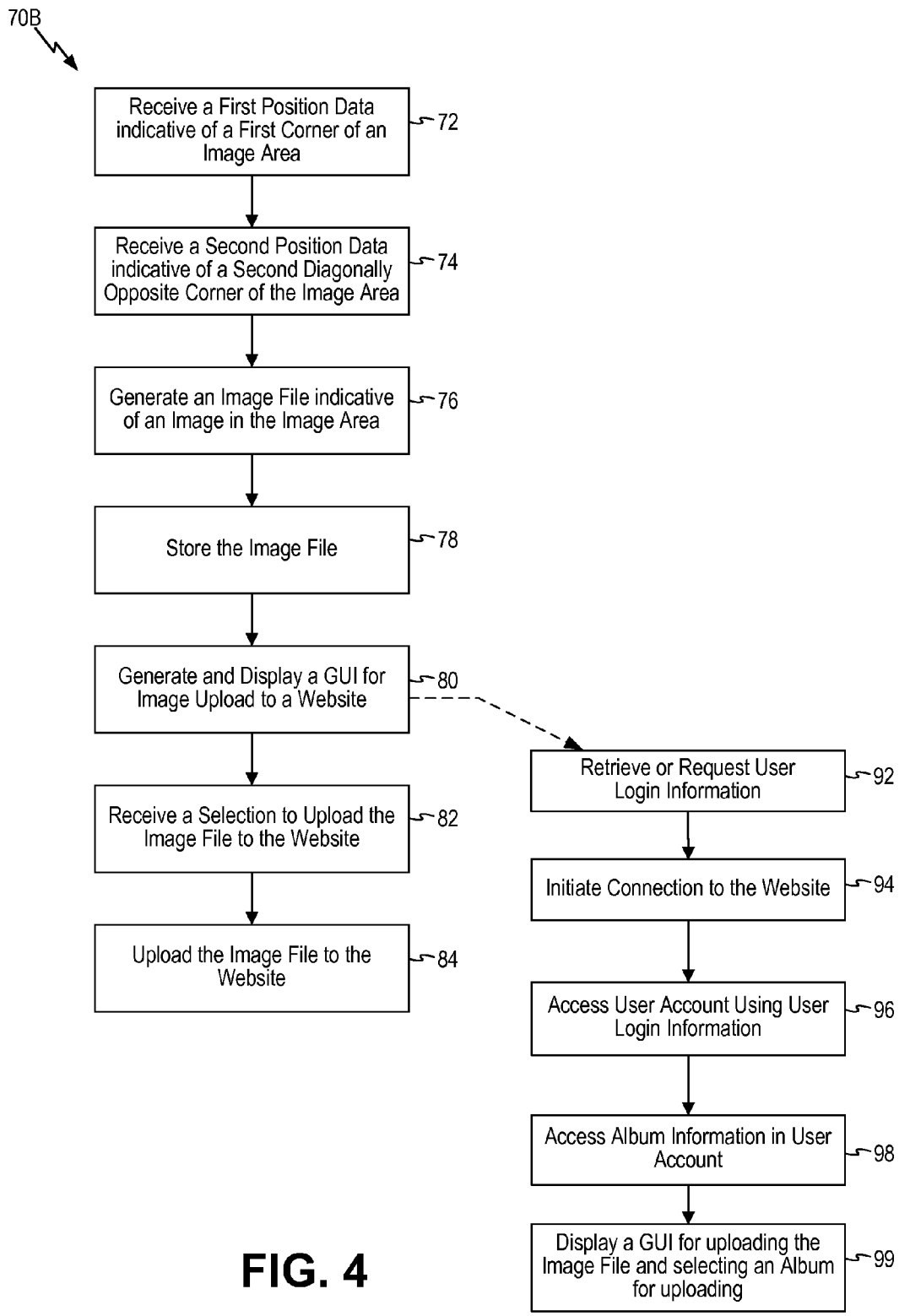
FIG. 4 is a flow chart of an image upload method according to examples of the present invention.

FIG. 4 is a flow chart of an image upload method in one example which is a variation of the image upload method in FIG. 3. Referring to FIG. 4, the image upload method 70B is executed by the processor 12 of the computing device 10 to implement uploading of an image to a website server. Executing the code for image upload application 24, the processor 12 receives input data from the pointing device 30 and may provide a graphical user interface (GUI) on the display 14.

In some examples, the image upload application 24 may be preconfigured by requesting and storing login information associated with a website server, such as user name and password, for a user account. In this manner, image upload method 70B realizes seamless uploading of images to the website server. In the event that user login information is not preconfigured, the image upload method 70B will request for the user login information for the user account when image upload is to be carried out, as will be explained in more detail below.

Image upload method 70B starts at block 72 where a first position data indicative of a first corner of an image area is received. For example, the pointing device 30 is positioned over the first corner of an image area and the image upload button 32 is actuated to generate the first position data. Then, at block 74, the image upload method 70B receives a second position data indicative of a second corner of the image area where the second corner is opposite and diagonal to the first corner. For example, the pointing device 30, with the image upload button 32 actuated, is moved to the second corner of the image area and the image upload button 32 is then released to generate the second position data.

At block 76, image upload method 70B then generates an image file indicative of the image content in the image area. In some examples, the image file is a JPEG file or a bitmap file. In some examples, method 70B uploads the image file to the website site server when the image file is generated (block 84). In other examples, the image file may be stored at least temporarily on the computing device 10 (block 78), such as in the memory 22. Then, image upload method 70B may generate and display a graphical user interface (GUI) for uploading the image to the website server (block 80). The GUI may provide a preview of the captured image. Through the GUI, the image upload method 70B may receive a selection to upload the image file to the website server (block 82). When the user login information is preconfigured, the image upload method 70B then uploads the image file to the website server to the user account associated with the user login information (block 84).

In some examples, the image upload method 70B may be configured to obtain user login information if the login information is not preconfigured. Furthermore, the image upload method 70B may be configured to retrieve album information for the user account and enable album selection and uploading to a selected album in the user account.

Referring to FIG. 4, in the image upload method 70B, when an image file has been created containing the image of the image area, the image upload method 70B determines if user login information has been preconfigured. Image upload method 70B either retrieves stored user login information or generates a GUI to request user login information (block 92). Image upload method 70B then initiates connection to the website server (block 94) and accesses the user account using the user login information (block 96). Image upload method 70B may further access the album information associated with the user account (block 98). Finally, the image upload method 70B generates and displays a GUI for uploading the image to the website server (block 99). In this case, the GUI may further display a list of the albums associated with the user account and provide an option to select an album from the album list to which the image file should be uploaded. In some examples, the image upload method 70B provides an option to create a new album to which the image file should be uploaded. The option to create a new album may be provided through an icon in the system tray of the computing device.

When a new album is created, the new album is added to the album list to allow the selection of the newly created album for image upload. When the image upload method 70B receives a selection to upload the image file to the website server (block 82), the image upload method 70B uploads the image file to the selected album or to a new album to be created on the website server (block 84).

Figure 5:
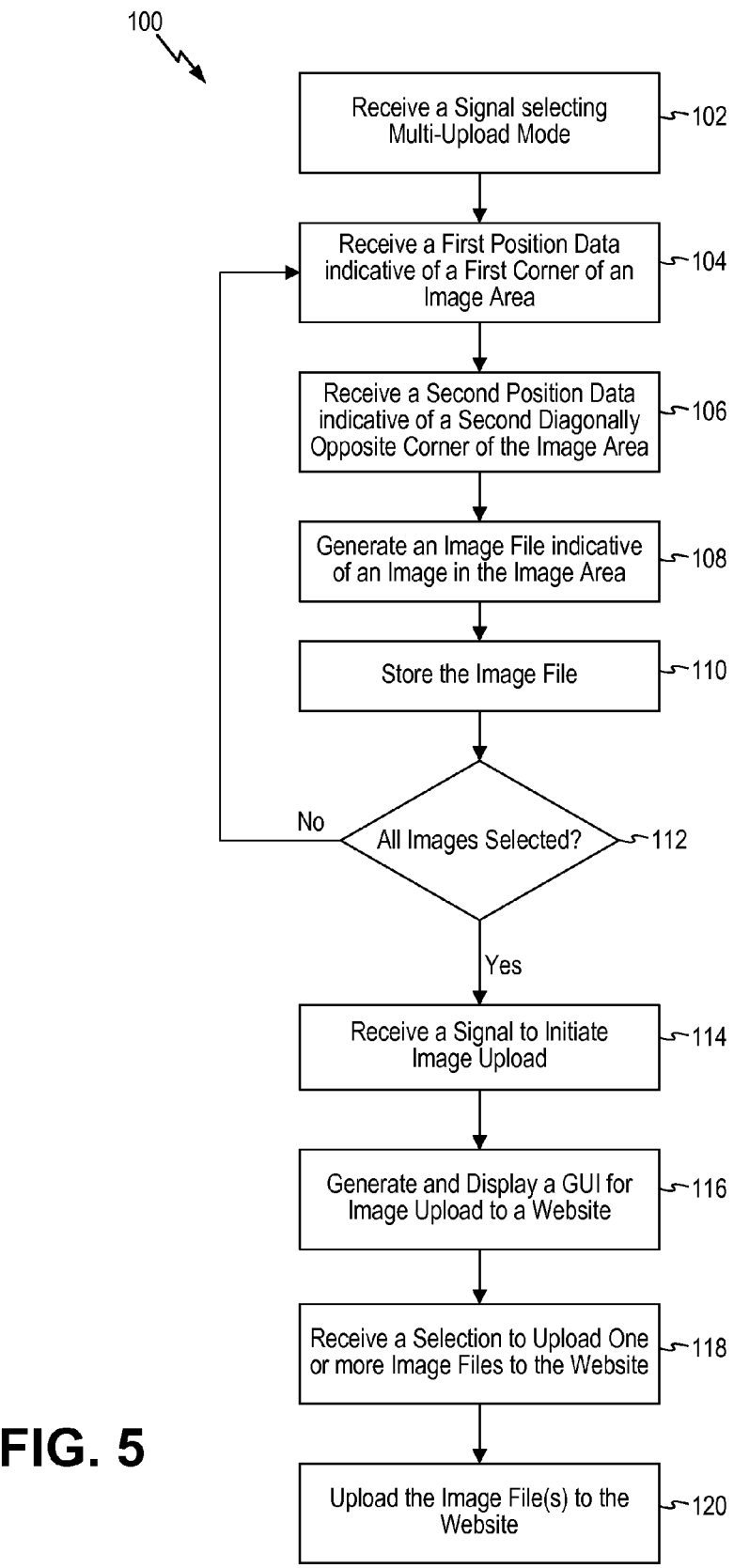
FIG. 5 is a flow chart of an image upload method for uploading multiple images according to examples of the present invention.

Method 70B above illustrates the image upload method for uploading one image at a time. In other examples, the image upload method may be configured to upload multiple images at once. FIG. 5 is a flow chart of an image upload method for uploading multiple images in one example. Referring to FIG. 5, an image upload method 100 starts by receiving a signal selecting the multi-upload mode (block 102). The multi-upload selection signal can be provided by configuring a setting in the image upload application, such as through an icon in the system tray of the computing device 10.

Then, image upload method 100 proceeds with receiving a first position data indicative of a first corner of an image area (block 104), receiving a second position data indicative of a second diagonally opposite corner of the image area (block 106) and generating an image file indicative of an image in the image area (block 108). Image upload method 100 may store the image file (block 110), such as in the memory 22. The image upload method 100 repeats blocks 104 to 110 until all images are selected (block 112). One or more image files are then generated on the computing device. In some examples, image upload method 100 uploads the image files of all images to the website server after the image files are generated (block 120).

In other examples, image upload method 100 may receive a signal to initiate image upload (block 114). Image upload may be initiated by opening an icon in the system tray of the computing device 10. Then, image upload method 100 may generate and display a graphical user interface (GUI) for uploading the one or more images to the website server (block 116). The GUI may provide a preview of the captured images. The image upload method 100 may receive a selection to upload one or more image files to the website server through the GUI (block 118). When the user login information is preconfigured, the image upload method 100 then uploads the one or more image files to the website server to the user account associated with the user login information (block 120).

In some examples, the image upload method 100 may provide through the GUI an album list and a selection of an album to which the image files should be uploaded may be made. In one example, the image upload method 100 provides an option to create a new album to which the image files should be uploaded, as described above. When the image upload method 100 receives a selection to upload the one or more image files to the website server (block 118), the image upload method 100 uploads the one or more image files to the selected album or to a new album to be created on the website server (block 120).

Figure 6:
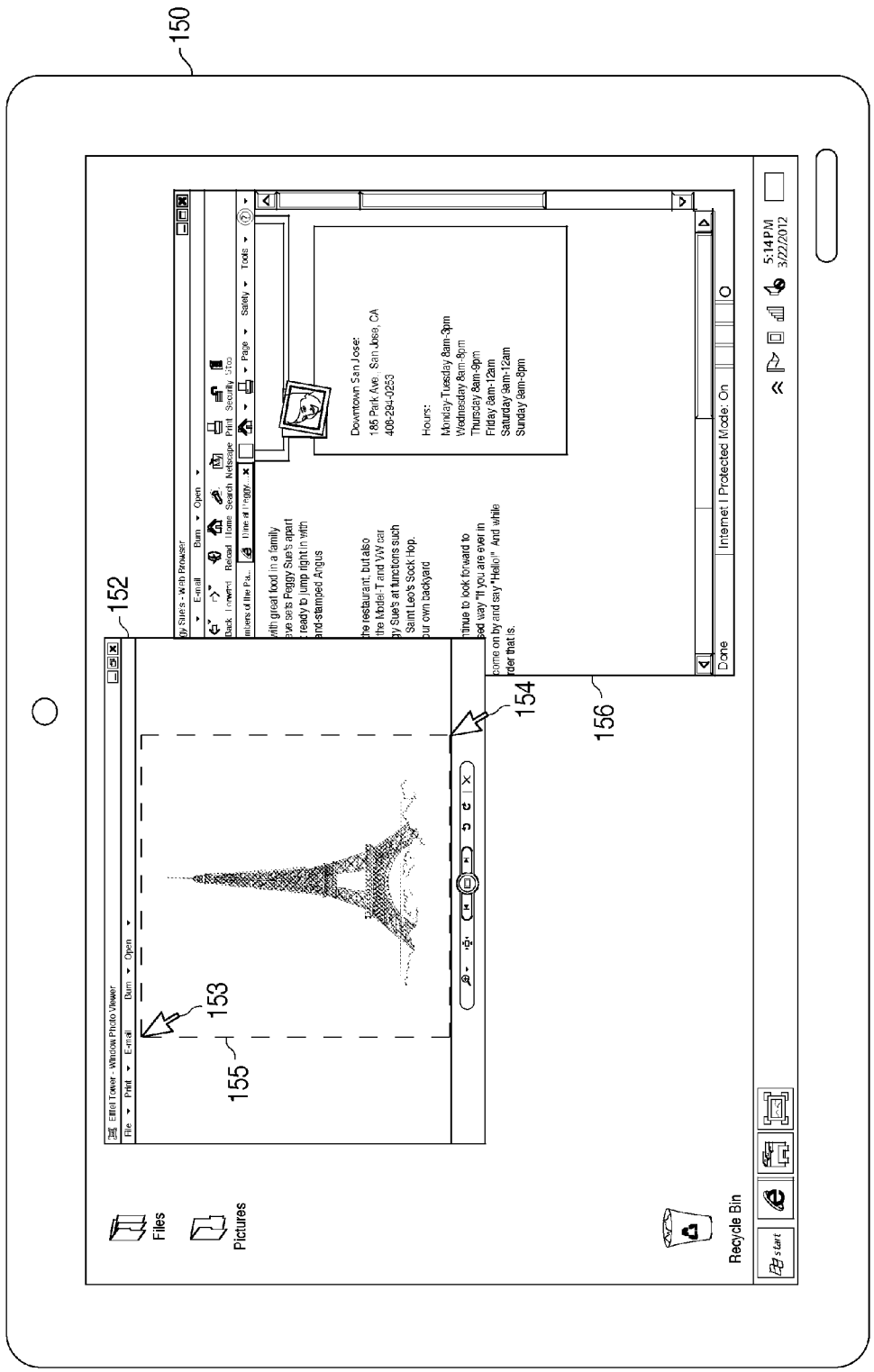
FIG. 6 is a screenshot of a computer display illustrating the operation of the image upload method for selecting an image area according to examples of the present invention.
Figure 7:
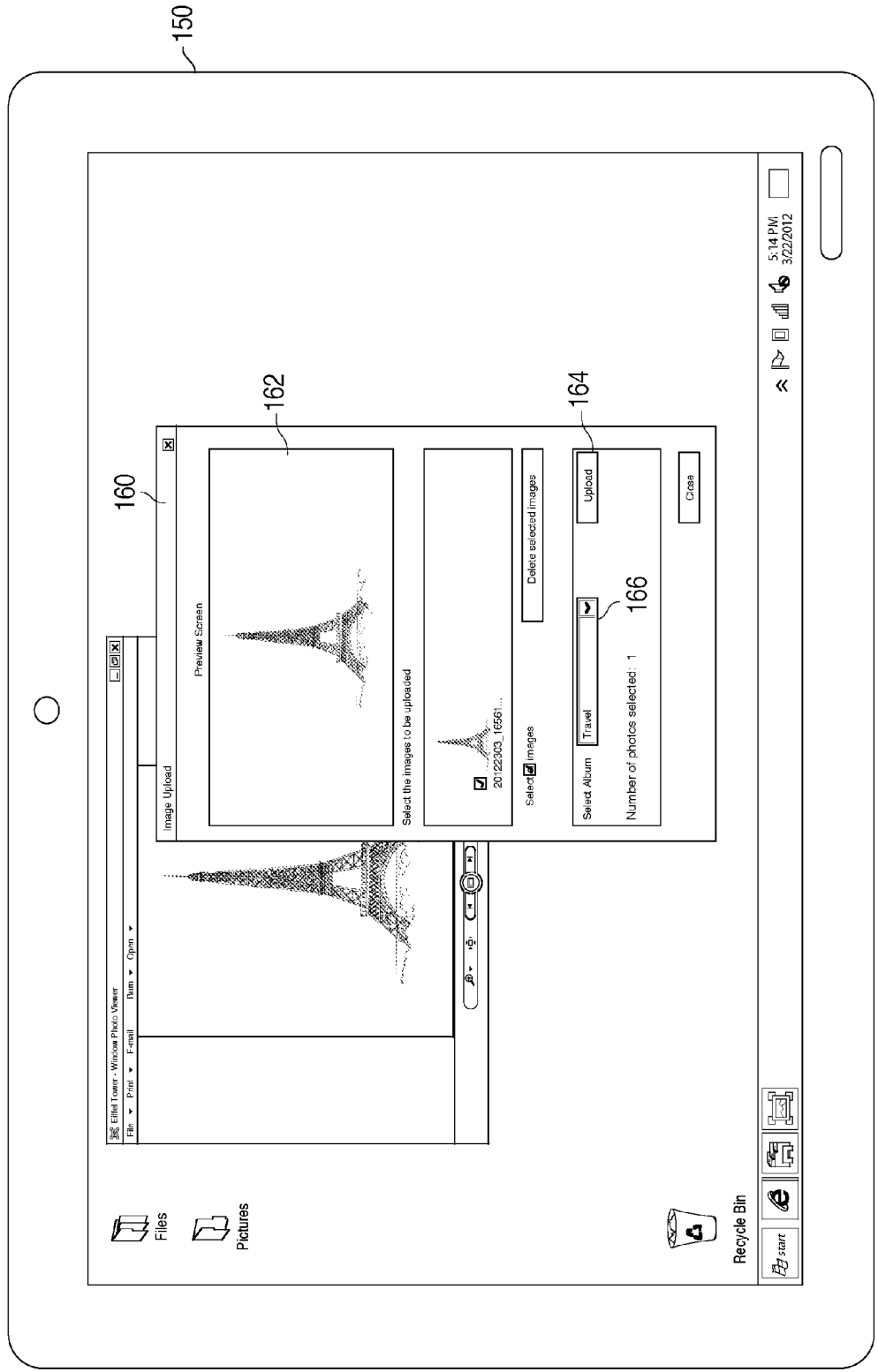
FIG. 7 is a screenshot of a computer display illustrating the graphical user interface (GUI) of the image upload method according to examples of the present invention.

The operation of the image upload methods 70A and 70B for uploading a single image is illustrated in the examples shown in FIGS. 6 and 7. FIG. 6 is a screenshot of a computer display illustrating the operation of the image upload method for selecting an image area in one example. FIG. 7 is a screenshot of a computer display illustrating the graphical user interface (GUI) of the image upload method in one example. Referring to FIG. 6, a computer display 150 has displayed thereon a picture of a scene, such as the Eiffel Tower, in a photo viewer window 152. The computer display 150 may further have displayed thereon a webpage in a web browser. Image upload methods 70A and 70B (FIGS. 3 and 4) may be applied to upload the image of the Eiffel Tower to a website, such as a social networking website or a photo-sharing website. A pointing device, such as the pointing device 30 in FIG. 1, is used to position the cursor over a first corner 153 of an image area 155. The image upload button on the pointing device is actuated and the cursor is moved to the second corner 154 of the image area 155 and the image upload button is released. Accordingly, the image area 155 is defined by the position data associated with the first and second corners. In the present illustration, the image area 155 is a rectangular box. In other examples, the image area 155 may have other shapes suitable for enclosing the desired image.

Referring to FIG. 7, when the image upload button is released, the image upload method may provide the GUI 160 showing a preview 162 of the captured image. A selection to upload the image file may be made through the "Upload" button 164. In some examples, the GUI 160 provides an album list 166 associated with the user account. A selection of a desired album to upload the image may be made at the album list 166.

Figure 8:
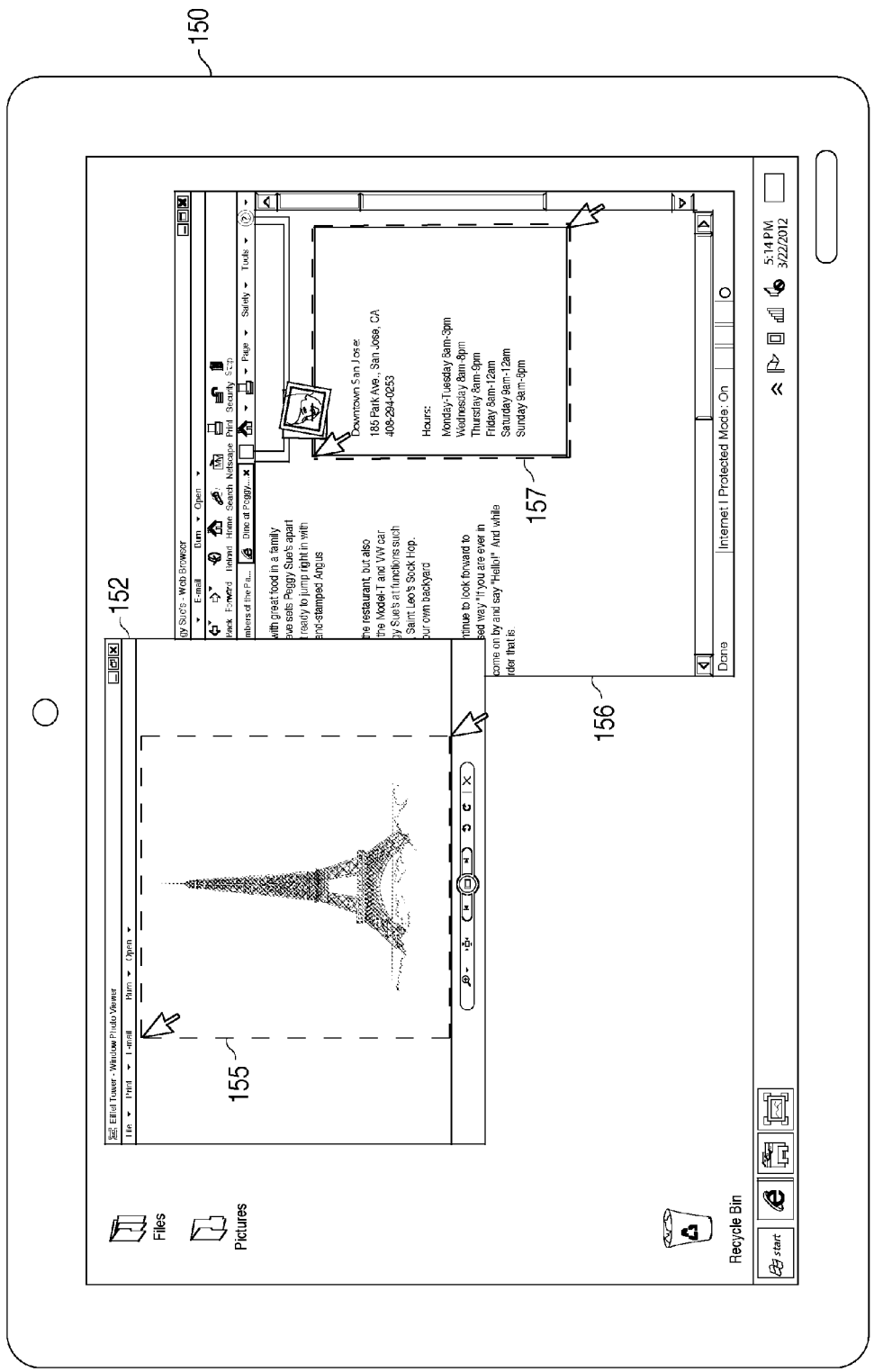
FIG. 8 is a screenshot of a computer display illustrating the operation of the image upload method for uploading multiple images according to examples of the present invention.
Figure 9:
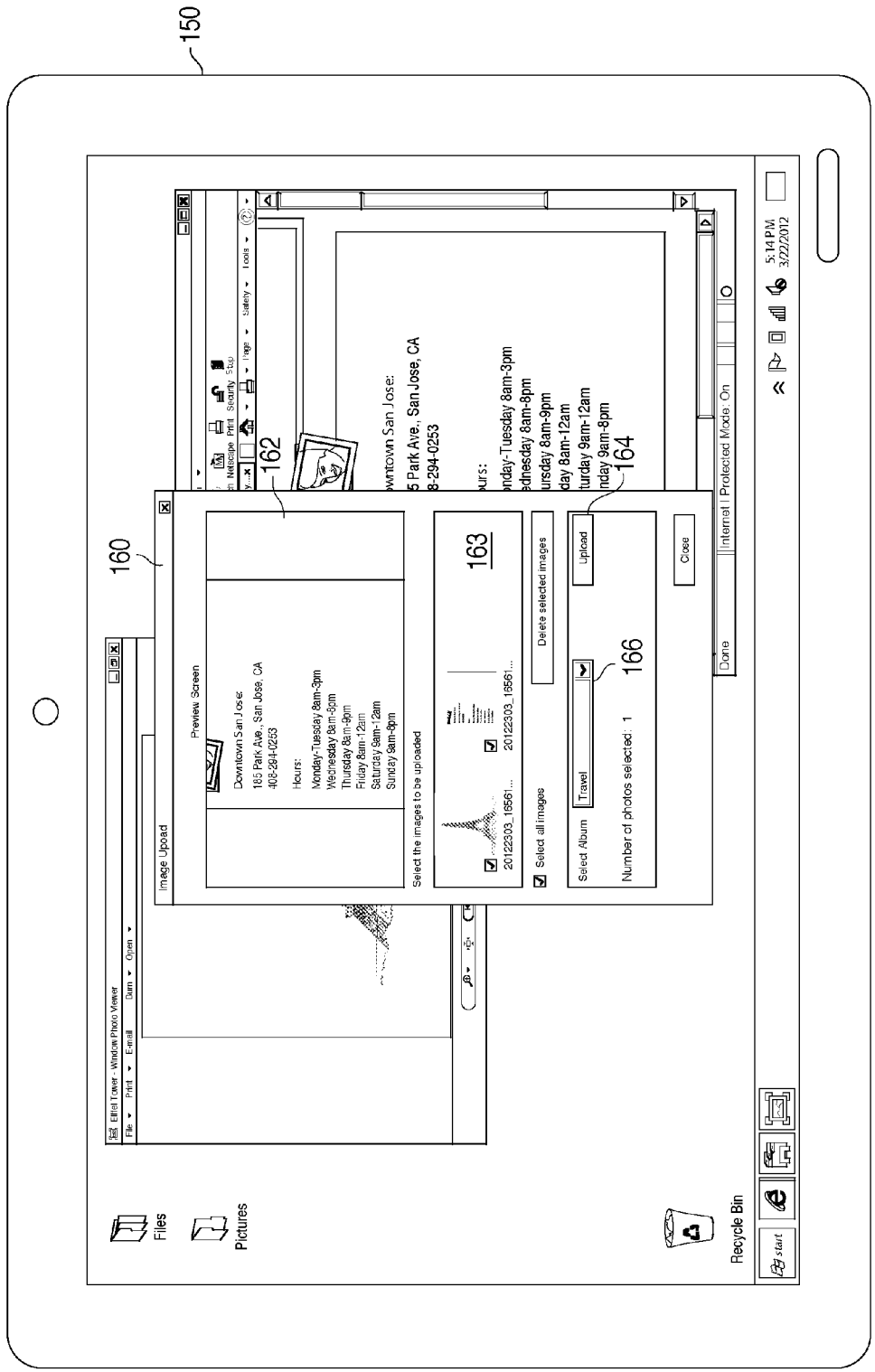
FIG. 9 is a screenshot of a computer display illustrating the graphical user interface (GUI) of the image upload method for uploading multiple images according to examples of the present invention.

The operation of the image upload method 100 for uploading multiple images is illustrated in the examples shown in FIGS. 8 and 9. FIG. 8 is a screenshot of a computer display illustrating the operation of the image upload method for uploading multiple images in one example. FIG. 9 is a screenshot of a computer display illustrating the graphical user interface (GUI) of the image upload method for uploading multiple images in one example.

Referring to FIG. 8, a computer display 150 has displayed thereon a picture of a scene, such as the Eiffel Tower, in a photo viewer window 152. The computer display 150 also further has displayed thereon a webpage in a web browser. Image upload method 100 (FIG. 5) may be applied to upload images of the Eiffel Tower as well as part of the web browser to a website, such as a social networking website or a photo-sharing website. A pointing device, such as the pointing device 30 in FIG. 1, is used to position the cursor over the image of the Eiffel Tower to define an image area 155 containing the desired image to be uploaded. Then, the pointing device is further used to position the cursor over the image in the web browser to define an image area 157 containing an image of a portion of the web page to be uploaded.

Referring to FIG. 9, when the image upload function is initiated, the image upload method 100 provides the GUI 160 showing a preview 162 of a captured image. The GUI 160 includes a selection box 163 listing the one or more image files that have been defined. One or more image files may be selected in selection box 163 for uploading to the website server. A selection to upload the one or more selected image files may be made through the "Upload" button 164. In some examples, the GUI 160 provides an album list 166 associated with the user account. A selection of a desired album to upload the one or more images may be made at the album list 166.

The image upload methods described above for uploading one or more images to a website server realize many advantages over conventional image upload methods. First, the image upload methods may provide an easy-to-use way to upload any images displayed on a display screen to a website server associated with a user account. The image upload methods described herein allow the user to simply draw a box around the desired image to be uploaded. There is no need to navigate to a file location to search for a specific file. The image upload methods described herein may allow a user to upload images of any part of the display screen—including images or text from any sources, such as a word processing document or from a web browser. More specifically, an image uploaded using the image upload methods described herein will not contain any metadata such as GPS location information indicating where the image is captured. In this manner, the privacy of the user is protected.

Figure 10:
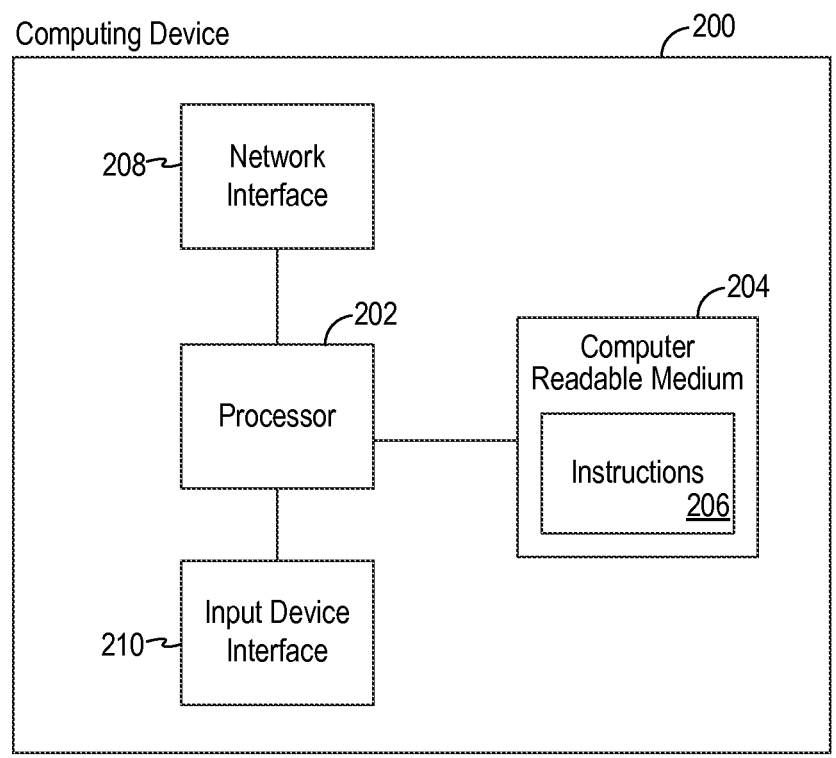
FIG. 10 is a block diagram of a computing device according to examples of the present invention.

FIG. 10 is a block diagram of a computing device in one example. Referring to FIG. 10, a computing device 200 includes a processor 202 in communication with a network interface 208 and an input device interface. The computing device 200 includes a computer readable medium 204 including instructions 206 that, when executed by the processor 202 of the computing device, cause the processor 202 to: receive a first position data indicative of a first corner of an image area; receive a second position data indicative of a second corner of the image area, the second corner being opposite and diagonal to the first corner; generate an image file indicative of an image in the image area; and upload, over the network, the image file to the website server.

The above detailed descriptions are provided to illustrate specific examples of the present invention and are not intended to be limiting. Numerous modifications and variations within the scope of the present invention are possible. The present invention is defined by the appended claims.

I claim:

1. A method for uploading an image to a website server over a network, comprising:
   detecting a selection of an image upload button from a pointing device to upload the image to the website server;
   in response to detecting the selection of the image upload button, receiving a first position data indicative of a first corner of an image area;
   detecting a release of the image upload button from the pointing device;
   in response to detecting the release of the image upload button, receiving a second position data indicative of a second corner of the image area, the second corner being opposite and diagonal to the first corner;
   generating an image file indicative of an image in the image area; and
   uploading, over the network, the image file to the website server.

2. The method of claim 1, further comprising:
   after generating the image file, receiving a selection to upload the image file to the website server.

3. The method of claim 2, further comprising:
   before receiving a selection to upload the image file, generating and displaying a graphical user interface;
   displaying a preview of the image file; and
   providing a control on the graphical user interface through which a selection to upload the image file is made.

4. The method of claim 1, further comprising:
   storing login information for a user account associated with the website server;
   before uploading the image file, accessing the user account on the website server using the stored login information; and
   uploading the image file to the user account associated with the website server.

5. The method of claim 4, further comprising:
   before uploading the image file, checking for presence of stored login information for a user account associated with the website server; and
   if no login information is stored, obtaining login information for the user account and accessing the user account on the website server using the stored login information.

6. The method of claim 4, further comprising:
   before uploading the image file, downloading an album list associated with the user account from the website server;
   generating a display of the album list;
   receiving a selection indicative of a selected album from the album list; and
   uploading the image file to the selected album associated with the user account on the website server.

7. The method of claim 4, further comprising:
   before uploading the image file, receiving a signal to create a new album;
   receiving a selection indicative of the new album; and
   uploading the image file to the new album in the user account on the website server.

8. The method of claim 1, wherein the website server comprises one of a social networking website or a photo-sharing website.

9. The method of claim 1, further comprising:
   before receiving a first position data, receiving a signal indicative of multiple image upload;
   repeating the steps of receiving a first position data, receiving a second position data, and generating an image file for multiple image areas;
   receiving a selection to upload multiple selected image files to the website server; and
   uploading, over the network, the multiple selected image files to the website server.

10. A computing system comprising:
    a pointing device including an image upload button; and
    a computing device in communication with the pointing device,
    wherein the computing device includes an input device interface to communicate with the pointing device; a display to display an image to be uploaded defined by an image area indicated by first and second corners using the image upload button; a processor to generate an image file indicative of the image in the image area, to receive a selection to upload the image to the website server, to generate and display a graphical user interface before receiving the selection to upload the image, to display a preview of the image area, and to provide a control on the graphical user interface through which a selection to upload the image is made; and a network interface to upload the image file to a website server.

11. The computing system of claim 10, wherein the computing device includes the processor further to receive a first position data indicative of the first corner of the image area and a second position data indicative of the second corner of the image area, the second corner being opposite and diagonal to the first corner, and to generate the image file using the first and second position data.

12. The computing, system of claim 11, wherein the website server comprises one of a social networking website or a photo-sharing website.

13. A non-transitory computer-readable storage medium comprising instructions that, when executed by a processor of a computing device, cause the processor to:
    detect a selection of an in an image upload button from a pointing device to upload an image to a website server;
    in response to detecting the selection of the image upload, button, receive a first position data indicative of a first corner of an image area;
    detect a release of the image upload button from the pointing device;
    in response to detecting the release of the image upload button, receive as second position data indicative of a second corner of the image area, the second corner being opposite and diagonal to the first corner;

generate an image file indicative of an image in the image area; and upload, over the network, the image file to the website server.

14. The non-transitory computer-readable storage medium of claim 13, further comprising instructions that, when executed by a processor of a computing device, cause the processor to:

after generating the image file, receive a selection to upload the image file to the website server.

15. The non-transitory computer-readable storage medium of claim 14, further comprising instructions that, when executed by a processor of a computing device, cause the processor to:

before receiving a selection to upload the image file, generate and display a graphical user interface;

display a preview of the image file; and provide a control on the graphical user interface through which a selection to upload the image file is made.

16. The non-transitory computer-readable storage medium of claim 13, wherein the website server comprises one of a social networking website or a photo-sharing website.

* * * * *

UNITED STATES PATENT AND TRADEMARK OFFICE
CERTIFICATE OF CORRECTION

| | | |
|---|---|---|
| PATENT NO. | : 9,218,539 B2 | Page 1 of 1 |
| APPLICATION NO. | : 13/457110 | |
| DATED | : December 22, 2015 | |
| INVENTOR(S) | : David H. Hanes | |

It is certified that error appears in the above-identified patent and that said Letters Patent is hereby corrected as shown below:

Claims

In column 8, line 53, in Claim 12, delete "computing, system" and insert -- computing system --, therefor.

In column 8, line 59, in Claim 13, delete "an in an image" and insert -- an image --, therefor.

In column 8, line 61, in Claim 13, delete "upload," and insert -- upload --, therefor.

In column 8, line 67, in Claim 13, delete "receive as" and insert -- receive a --, therefor.

Signed and Sealed this
Nineteenth Day of April, 2016

Michelle K. Lee
*Director of the United States Patent and Trademark Office*